July 21, 1931.  H. GILDNER  1,815,294
SAFETY DEVICE FOR AUTOMOBILES
Filed Dec. 30, 1927
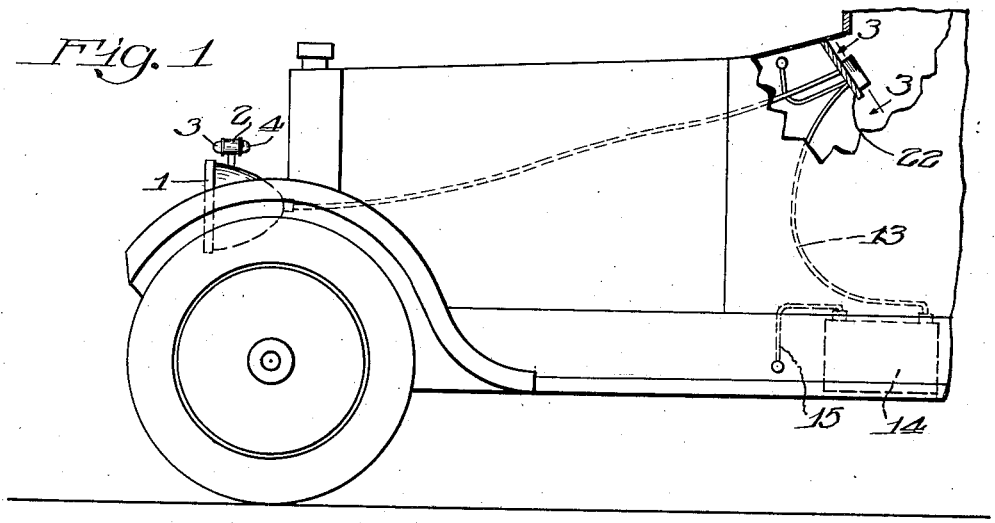
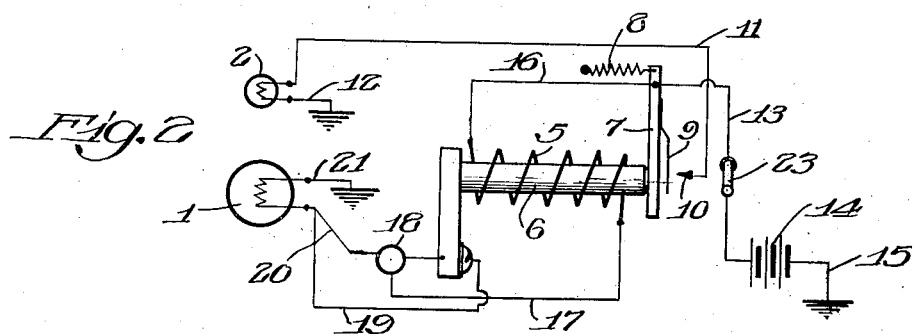
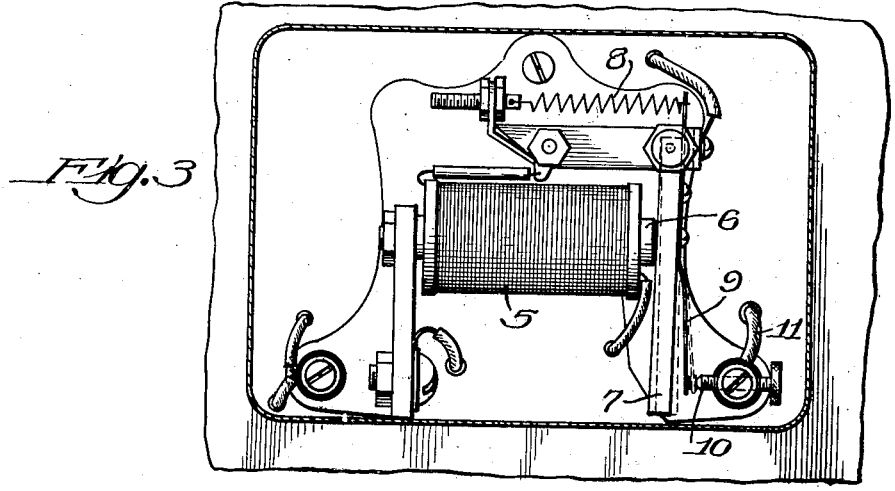
Inventor
Harold Gildner
By Parker & Carter Attys Patented July 21, 1931

1,815,294

UNITED STATES PATENT OFFICE

HAROLD GILDNER, OF SHEBOYGAN, WISCONSIN

SAFETY DEVICE FOR AUTOMOBILES

Application filed December 30, 1927. Serial No. 243,631.

This invention relates to safety devices for automobiles and has for its object to provide a new and improved device of this description.

In driving automobiles it often happens that one of the headlights goes out due to injury to the bulb or for other reasons and with the strong headlights now employed this may happen without the driver becoming aware that one of the headlights is not functioning. This presents a dangerous condition as vehicles coming in the opposite direction cannot properly locate the vehicle with one of its lights out and hence collisions and other accidents such as running off the road and the like are liable to happen.

One of the objects of my invention is to provide an automatically acting device which will indicate to the driver when one of the headlights goes out and which one is out so that he may at once remedy the trouble.

My invention has as a further object to automatically light an auxiliary headlight when the main headlight goes out so that vehicles coming in the opposite direction can properly locate the vehicle with one or both of its main headlights out and thus eliminate the danger presented by such conditions.

The invention has further objects which are more particularly pointed out in the accompanying description.

Referring now to the drawings:

Fig. 1 is a view showing the front of an automobile with one form of headlight embodying the invention.

Fig. 2 is a diagrammatic view showing the circuits.

Fig. 3 is an enlarged sectional view taken on line 3—3 Fig. 1.

Like numerals refer to like parts throughout the several figures.

Referring now to the drawings, I have shown a portion of the automobile including the headlights 1. Associated with each headlight is an auxiliary safety light 2. These auxiliary safety lights may be located in any desired position. For purposes of illustration I have shown them as connected with the headlights 1. Each safety light is arranged so that it will automatically light in the event the headlight with which it is associated becomes extinguished. The safety light is arranged and positioned so that it will indicate to the driver that the headlight is out. This may best be done by means of a red light.

I also prefer to provide an auxiliary headlight which will be seen by oncoming machines and this is best accomplished by an ordinary light or white light. In the construction shown both of these results are secured by a single bulb of the light 2.

This bulb is inclosed in a suitable casing which has at the front a colorless or white glass piece 3 and at the rear a red or colored piece 4 so that when the light is lighted, it will show white in front and red at the rear. When the headlights are properly lighted the auxiliary light is not lighted. Means is provided for automatically lighting the auxiliary light when the head light goes out or ceases to operate. I have illustrated in the drawings one construction for this purpose.

In this construction an electro-magnetic device such as the coil 5 with the core 6 is provided. This coil is provided with an armature 7 in proximity to the core 6 so as to be moved thereby when the core is energized. The armature is provided with a retracting spring 8. The armature is also provided with a spring contact 9 which engages a contact 10 when the armature is retracted by spring 8, that is, when the core 6 is deenergized. When the core 6 is energized, the armature is moved so as to disconnect the contacts 9 and 10 and break the circuit through the conductor 11 and the auxiliary headlight 2, said headlight being grounded by the conductor 12 which is connected to the metal frame of the automobile by being connected to the metal part of the headlight or other parts of the frame.

The armature 7 is connected by conductor 13 with the battery 14, said battery being grounded by means of the wire 15. The conductor 13 is connected through armature 7 and conductor 16 with the coil 5. The coil 5 is connected by conductor 17 with the terminal 18 and the terminal 18 (and hence the coil 5) is connected by conductors 19 and 20 in parallel, with one terminal of the main headlight 1. The other terminal of the said headlight is grounded by conductor 21, said conductor being connected with some metal part of the machine. The coil 5 may be located at any convenient point.

In the construction I have shown it as being attached to the dash board 22 so as to be easily accessible by the driver. The usual switch 23 is provided on the dash board so that the headlights may be turned on or off. I have shown the circuits and arrangements for a single headlight in order to make the invention clear but it is therefor understood that each automobile is to have two headlights, each having an auxiliary headlight arranged as I have shown herein.

The use and operation of my invention are as follows:

When it is desired to use the headlight, switch 23 is turned on, parts being illustrated in Fig. 2. The current then passes from battery 4 through conductor 13 and conductor 16 to coil 5 thence by conductor 17 to terminal 18 and thence by conductors 19 and 20 to the main headlight 1 thence through the light and through conductor 21 to ground and thence back through conductor 15 to battery 14. The headlight 1 is now lighted.

The current is now flowing through coil 5 and the core 6 is now energized. This core attracts the armature 7 to the position shown in Figs. 2 and 3 and disconnects contacts 9 and 10. The circuit is therefore broken through auxiliary headlight 2 and it is out of operation, only the main headlight being lighted. If now the main headlight goes out for any reason, the circuit will be broken and the current will cease to flow through coil 5, this causes core 6 to be deenergized and the retracting spring moves out armature 7 so that contacts 9 and 10 are brought into contact. This automatically completes the circuit through the auxiliary headlight 2 causing the current to flow through and light the auxiliary headlight.

This circuit is traced as follows:
From battery 14 through conductor 13 to armature 7 thence through contacts 9 and 10 and conductor 11 to auxiliary headlight 2 thence through said headlight 2 thence by conductor 12 to ground and thence through conductor 15 back to the battery. It will thus be seen that the auxiliary headlight is automatically lighted when the main headlight ceases to operate. The driver instantly sees the red light produced by the glass 4 and knows that the main headlight is out. The auxiliary headlight, in addition to giving the warning signal to the driver also provides a light for the approaching vehicles so that such approaching vehicles can properly locate the car when either one or both of the main headlights go out.

When the driver gets the warning signal, he can then investigate and fix the main headlights. While he is doing this, if he is unable to pull off the road, he is protected from the oncoming vehicles by the auxiliary headlights which are now lighted and show the driver of the oncoming vehicles the location of the car. When the main headlight is put in order the circuit therethrough is complete and the auxiliary headlight then goes out.

I claim:

1. A safety device for automobiles comprising two main headlights, an auxiliary headlight associated with each main headlight and normally inoperative and means for automatically bringing the auxiliary headlight associated with either main headlight into operation when the main headlight with which it is associated ceases to operate.

2. A safety device for automobiles comprising two main headlights, a source of electric current supply, means for connecting said source of current supply in circuit with the main headlight, an electromagnetic device in said circuit, an auxiliary headlight associated with each main headlight and a circuit therefor normally open and means controlled by said electromagnetic device for connecting either circuit of the auxiliary headlight with the source of electric supply when the circuit through the main headlight with which it is associated is broken.

3. A safety device for automobiles comprising a main headlight, an auxiliary headlight, a source of electric supply, circuits connecting both of said headlights with said source of electric supply, a ground connection for the main headlight and the auxiliary headlight, an electromagnetic device in the circuit of the main headlight which acts to hold the circuit of the auxiliary headlight open while the main headlight is in operation.

4. A safety device for automobiles comprising a main headlight, having one of its terminals grounded, a core, a coil on said core, two conductors in parallel connecting said coil with the other terminal of said headlight, an armature in proximity to said core, a source of electric supply connected with said armature and with said coil, an auxiliary headlight having one terminal grounded, a contact in proximity to said armature and connected with the other terminal on said auxiliary headlight, and means for electrically connecting said armature with said contact when the circuit through the main headlight is broken so as to connect the auxiliary headlight with said source of electric supply.

5. A safety device for automobiles comprising a main headlight, an auxiliary headlight normally inoperative and means for automatically bringing the auxiliary headlight into operation when the main headlight ceases to operate and an indicating device which automatically indicates when the main headlight ceases to operate.

Signed at Chicago, county of Cook and State of Illinois, this twenty-first day of December, 1927.

HAROLD GILDNER.